United States Patent
Sasagawa et al.

(10) Patent No.: US 10,985,399 B2
(45) Date of Patent: Apr. 20, 2021

(54) NEGATIVE ELECTRODE FOR LITHIUM ION SECONDARY BATTERY, AND LITHIUM ION SECONDARY BATTERY USING THE SAME

(71) Applicant: TDK CORPORATION, Tokyo (JP)

(72) Inventors: Hiroshi Sasagawa, Tokyo (JP); Yasuyuki Kawanaka, Tokyo (JP); Hideaki Seki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 209 days.

(21) Appl. No.: 16/032,801

(22) Filed: Jul. 11, 2018

(65) Prior Publication Data

US 2019/0027779 A1    Jan. 24, 2019

(30) Foreign Application Priority Data

Jul. 18, 2017 (JP) .............................. JP2017-138692
May 8, 2018 (JP) .............................. JP2018-089617

(51) Int. Cl.
*H01M 10/0525* (2010.01)
*H01M 4/583* (2010.01)
(Continued)

(52) U.S. Cl.
CPC ....... *H01M 10/0525* (2013.01); *C01B 32/184* (2017.08); *C01B 32/20* (2017.08); *H01M 4/133* (2013.01); *H01M 4/134* (2013.01); *H01M 4/364* (2013.01); *H01M 4/386* (2013.01); *H01M 4/387* (2013.01); *H01M 4/505* (2013.01); *H01M 4/525* (2013.01); *H01M 4/583* (2013.01); *H01M 4/587* (2013.01); *H01M 4/622* (2013.01); *H01M 4/623* (2013.01); *H01M 4/661* (2013.01); *H01M 10/0569* (2013.01); *H01M 50/172* (2021.01); *H01M 50/411* (2021.01);
(Continued)

(58) Field of Classification Search
CPC ...... H01M 4/583; H01M 4/525; H01M 4/505; H01M 4/66; H01M 10/0525; H01M 10/0569
See application file for complete search history.

(56) References Cited

U.S. PATENT DOCUMENTS

2015/0380733 A1* 12/2015 Lee ..................... H01M 4/0471
                                                                  429/219
2016/0118655 A1*  4/2016 Yoshikawa ............ C01B 33/18
                                                                  429/231.8
(Continued)

FOREIGN PATENT DOCUMENTS

JP       2011-60701 A        3/2011
WO    2014/051067 A1        4/2014
WO    WO 2016008455 A  *  1/2016  .............. H01M 4/36

*Primary Examiner* — Kenneth J Douyette
(74) *Attorney, Agent, or Firm* — Oliff PLC (57) ABSTRACT

A negative electrode for a lithium ion secondary battery includes a current collector and an active material-containing layer disposed on the current collector. The active material-containing layer includes: a first negative electrode active material including a carbon material; a second negative electrode active material including a metal element or a metalloid element as a constituent element, the metal element or the metalloid element being capable of forming an alloy with lithium; and a binder. The first negative electrode active material contains a spherical graphite, and the binder contains an acrylic resin.

7 Claims, 1 Drawing Sheet

(51) Int. Cl.
    *H01M 4/525*     (2010.01)
    *H01M 4/505*     (2010.01)
    *C01B 32/20*     (2017.01)
    *H01M 4/587*     (2010.01)
    *H01M 4/62*      (2006.01)
    *H01M 4/38*      (2006.01)
    *H01M 4/133*     (2010.01)
    *H01M 4/36*      (2006.01)
    *H01M 4/134*     (2010.01)
    *H01M 50/44*     (2021.01)
    *H01M 50/172*    (2021.01)
    *H01M 50/411*    (2021.01)
    *C01B 32/184*    (2017.01)
    *H01M 4/66*      (2006.01)
    *H01M 10/0569*   (2010.01)
    *H01M 4/02*      (2006.01)

(52) U.S. Cl.
    CPC ...... *H01M 50/44* (2021.01); *H01M 2004/027* (2013.01); *H01M 2004/028* (2013.01)

(56) References Cited

U.S. PATENT DOCUMENTS

| | | | |
|---|---|---|---|
| 2016/0126553 A1* | 5/2016 | Murase | H01M 4/13 429/217 |
| 2017/0207457 A1* | 7/2017 | Yue | H01M 4/583 |

* cited by examiner

NEGATIVE ELECTRODE FOR LITHIUM ION SECONDARY BATTERY, AND LITHIUM ION SECONDARY BATTERY USING THE SAME

CROSS-REFERENCE TO RELATED APPLICATION

This application claims priority from Japanese Patent Application Nos. 2017-138692 filed on Jul. 18, 2017 and 2018-089617 filed on May 8, 2018 with the Japan Patent Office, the entire contents of which are hereby incorporated by reference

BACKGROUND

1. Technical Field

The present disclosure relates to a negative electrode for a lithium ion secondary battery, and a lithium ion secondary battery using the negative electrode.

2. Description of the Related Art

Lithium ion secondary batteries are lightweight and have high capacity compared with nickel-cadmium batteries and nickel metal-hydride batteries. For this reason, lithium ion secondary batteries have been widely used as power supplies for portable electronic devices. Lithium ion secondary batteries are also considered a prime candidate for power supplies mounted on hybrid vehicles and electric vehicles. With the decreases in size and increases in functionality of portable electronic devices that have been achieved in recent years, a further increase in the capacity of the lithium ion secondary battery for such power supplies is desired.

The capacity of a lithium ion secondary battery mainly depends on the electrode active material. As a negative electrode active material, generally graphite has been used. However, theoretical capacity of graphite is 372 mAh/g while the batteries in practical use already have a capacity of approximately 350 mAh/g. Thus, in order to obtain a non-aqueous electrolyte secondary battery having a sufficient capacity as an energy source for future sophisticated portable devices, a further increase in capacity is desirable.

Examples of the negative electrode active material include alloy-based compounds including Si or Sn. These alloy-based compounds are capable of electrochemically absorbing and desorbing lithium ions, and can perform very high-capacity charging and discharging compared with graphite. By mixing conventionally used graphite with an alloy-based compound, even higher capacities have been achieved.

However, when such alloy-based compounds are used as a negative electrode active material, expansion and shrinkage of the negative electrode active material due to lithium ion intercalation and deintercalation during charging and discharging become pronounced. As a result, a current collection failure may be caused by disconnection in electroconductive paths in the negative electrode active material layer and the current collector, making it difficult to obtain a lithium ion secondary battery having sufficient cycle characteristics. This also applies to a case where graphite and an alloy-based compound are mixed. That is, if the content of alloy-based compound is increased to obtain high capacity, it becomes difficult to obtain sufficient cycle characteristics.

With respect to the problem discussed above, JP-A-2011-60701, for example, proposes using a binder of polyimide, polyamide-imide, polyamide, and the like.

SUMMARY

A negative electrode for a lithium ion secondary battery includes a current collector and an active material-containing layer disposed on the current collector. The active material-containing layer includes: a first negative electrode active material including a carbon material; a second negative electrode active material including a metal element or a metalloid element as a constituent element, the metal element or the metalloid element being capable of forming an alloy with lithium; and a binder. The first negative electrode active material contains a spherical graphite, and the binder contains an acrylic resin.

DESCRIPTION OF THE EMBODIMENTS

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

With the technology described in JP-A-2011-60701, sufficient cycle characteristics are not obtained. Accordingly, an object of the present disclosure is to provide a negative electrode for a lithium secondary battery that has excellent cycle characteristics, and a lithium ion secondary battery using the negative electrode.

A negative electrode for a lithium ion secondary battery according to an embodiment of the present disclosure includes a current collector and an active material-containing layer disposed on the current collector. The active material-containing layer includes a first negative electrode active material including a carbon material; a second negative electrode active material including a metal element or a metalloid element as a constituent element, the metal element or the metalloid element being capable of forming an alloy with lithium; and a binder. The first negative electrode active material contains a spherical graphite, and the binder contains an acrylic resin.

In this configuration, it becomes possible to obtain a negative electrode for a lithium secondary battery that has excellent cycle characteristics. While the reason for this is not necessarily clear, it is contemplated that this is due to a difference between the adsorption of acrylic resin with respect to the first negative electrode active material and the adsorption of acrylic resin with respect to the second negative electrode active material. Specifically, it is contemplated as follows. The acrylic resin binds to the spherical graphite as the first negative electrode active material in a state closer to point-contact. On the other hand, the acrylic resin binds to the second negative electrode active material in a planar-covering manner. Thus, excessive binder attachment to the spherical graphite is suppressed. In addition, expansion and shrinkage of the second negative electrode active material associated with charging and discharging are suppressed.

Accordingly, the inclusion of acrylic resin as the binder provides excellent cycle characteristics.

Preferably, the second negative electrode active material may include at least one selected from Si and Sn as the constituent element.

In this configuration, the cycle characteristics are further improved. This is contemplated to be because of the following. Since the affinity between the second negative electrode active material including at least one selected from Si and Sn as a constituent element and the acrylic resin is enhanced, the effect of suppressing the expansion and shrinkage during charging and discharging can be efficiently obtained.

Preferably, a ratio A:B of a weight A of the first negative electrode active material to a weight B of the second negative electrode active material may be 99:1 to 65:35.

In this configuration, superior cycle characteristics can be obtained.

Preferably, a ratio (A+B)/C of the total of the weight A of the first negative electrode active material and the weight B of the second negative electrode active material to a weight C of the binder may be 6 to 20.

In this configuration, superior cycle characteristics can be obtained.

Preferably, a ratio B/C of the weight B of the second negative electrode active material to the weight C of the binder may be 1.4 to 3.

In this configuration, superior cycle characteristics can be obtained. This is contemplated to be because the amount of binder with respect to the second negative electrode active material is optimized.

According to the embodiments of the present disclosure, it becomes possible to provide a negative electrode for a lithium ion secondary battery having excellent cycle characteristics, and a lithium ion secondary battery using the negative electrode.

In the following, a preferred embodiment of the present disclosure will be described with reference to the drawings. It is to be noted, however, that the present disclosure is not limited to the following embodiment. The components described below may include those that may easily occur to a person skilled in the art, and those which are substantially identical. The components described below may be combined, as appropriate.

(Lithium ion secondary battery)

Figure 1:
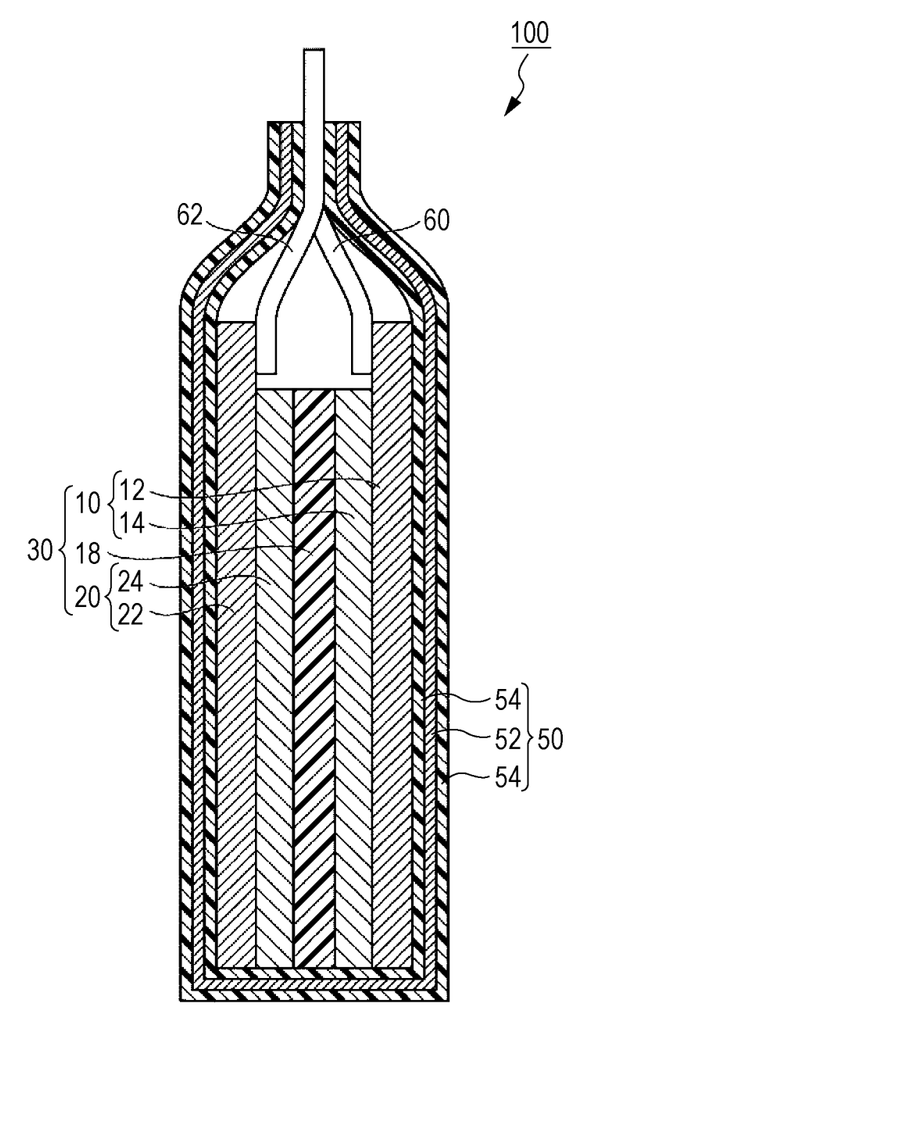
FIG. 1 is a schematic cross sectional view of a lithium ion secondary battery according to an embodiment.

FIG. 1 is a schematic cross sectional view illustrating a lithium ion secondary battery according to the present embodiment. As illustrated in FIG. 1, the lithium ion secondary battery 100 mainly includes a stacked body 30, a case 50, and a pair of leads 60, 62 connected to the stacked body 30. The case 50 houses the stacked body 30 while being seal ed.

In the stacked body 30, a pair of positive electrode 10 and a negative electrode 20 is disposed opposing each other with a separator 18 disposed therebetween. The positive electrode 10 includes a plate-like (film-shaped) positive electrode current collector 12, and a positive electrode active material layer 14 disposed on the positive electrode current collector 12. The negative electrode 20 includes a plate-like (film-shaped) negative electrode current collector 22, and a negative electrode active material layer 24 disposed on the negative electrode current collector 22. A major surface of the positive electrode active material layer 14 and a major surface of the negative electrode active material layer 24 are respectively contacted with major surfaces of the separator 18. The leads 60, 62 are respectively connected to edge parts of the positive electrode current collector 12 and the negative electrode current collector 22. Edge parts of the leads 60, 62 extend to the outside of the case 50.

In the following, the positive electrode 10 and the negative electrode 20 may be collectively referred to as electrodes 10, 20; the positive electrode current collector 12 and the negative electrode current collector 22 may be collectively referred to as current collectors 12, 22; and the positive electrode active material layer 14 and the negative electrode active material layer 24 may be collectively referred to as active material layers 14, 24. First, the electrodes 10, 20 will be described.

(Positive Electrode Current Collector)

The positive electrode current collector 12 may be a conductive plate material. Examples of the material of the positive electrode current collector 12 that can be used include metal thin plates (metal foil) of aluminum, aluminum alloy, and stainless steel.

(Positive Electrode Active Material Layer)

The positive electrode active material layer 14 mainly includes a positive electrode active material, a positive electrode binder, and a required amount of conductive auxiliary agent.

(Positive Electrode Active Material)

The positive electrode active material is not particularly limited, provided that the positive electrode active material is capable of reversibly proceeding absorption and desorption of lithium ions, intercalation and deintercalation of lithium ions, or doping and dedoping of lithium ions and counter anions (such as $PF_6^-$) of the lithium ions. As the positive electrode active material, a known electrode active material may be used. Examples of the positive electrode active material include lithium cobaltate ($LiCoO_2$), lithium nickelate ($LiNiO_2$), lithium manganese spinel ($LiMn_2O_4$), and mixed metal oxides. The mixed metal oxides may include: mixed metal oxides expressed by the general formula $LiNi_xCo_yMn_zMaO_2$ (x+y+z+a=1, $0 \leq x \leq 1$, $0 \leq y \leq 1$, $0 \leq z \leq 1$, $0 \leq a \leq 1$, where M is one or more elements selected from Al, Mg, Nb, Ti, Cu, Zn, and Cr); lithium vanadium compounds ($LiV_2O_5$, $LiVOPO_4$); olivine $LiMPO_4$ (where M is one or more elements selected from Co, Ni, Mn, Fe, Mg, Nb, Ti, Al, and Zr); lithium titanate ($Li_4Ti_5O_{12}$); and Li-excess solid solutions expressed by $LiNi_xCo_yAl_zO_2$ (0.9<x+y+z<1.1) or $Li_2MnO_3$—$LiMO_2$ (where M is one or more elements selected from Mn, Co, and Ni).

Among others, as the positive electrode active material, preferably $LiNi_xCo_yMn_zMaO_2$ (x+y+z+a=1, $0 \leq x \leq 1$, $0 \leq y \leq 1$, $0 \leq z \leq 1$, $0 \leq a \leq 1$, M is one or more elements selected from Al, Mg, Nb, Ti, Cu, Zn, and Cr) may be used. By combining the positive electrode using the above with the negative electrode for a lithium ion secondary battery according to the present embodiment, it becomes possible to achieve both high discharge capacity and good cycle characteristics.

Particularly preferably, a layered oxide expressed by $LiNi_xCo_yAl_{1-x-y}O_2$ ($0.7 \leq x \leq 0.9$, $0.05 \leq y \leq 0.2$) or $LiNi_xCo_yMn_zO_2$ ($0.5 \leq x \leq 0.8$, $0.1 \leq y \leq 0.2$, $0.1 \leq z \leq 0.3$) that has a high content of Ni among the transition metals may be used. By using the above, it becomes possible to obtain a particularly high discharge capacity while maintaining good cycle characteristics.

Specific examples of the positive electrode active material include $LiNi_{0.85}Co_{0.10}Al_{0.05}O_2$, $LiNi_{0.80}Co_{0.10}Mn_{0.10}O_2$, $LiNi_{0.60}Co_{0.20}Mn_{0.20}O_2$, and $LiNi_{0.50}Co_{0.20}Mn_{0.30}O_2$.

(Positive Electrode Binder)

A binder binds the positive electrode active material together and also binds the positive electrode active material and the current collector 12. Any binder may be used provided that the binder is capable of achieving the above binding. Examples of the binder material include fluorine resins, such as polyvinylidene fluoride (PV D F) and polytetrafluoroethylene(PT FE). Other examples of the binder include cellulose, styrene/butadiene rubber, ethyl ene/propylene rubber, polyimide resin, and polyamide-imide resin. As the binder, it is also possible to use a conductive polymer having electronic conductivity or an ionically conductive polymer. An example of the conductive polymer having electronic conductivity is polyacetylene. In this case, a conductive auxiliary agent may not necessarily be added since the binder also provides the function of conductive auxiliary agent particles. As the ionically conductive polymer, it is possible to use a material having ion conductivity for lithium ions and the like, for example. Examples of the material include polymers obtained by compounding a monomer of a polymer compound (such as polyether-based polymer compounds including polyethylene oxide and polypropylene oxide, and polyphosphazene) with a lithium salt or an alkali metal salt that contains lithium as a main component, such as $LiClO_4$, $LiBF_4$, and $LiPF_6$. Examples of a polymerization initiator used for the compounding include a photopolymerization initiator or a thermal polymerization initiator adapted for the monomer.

The content of the binder in the positive electrode active material layer 14 is not particularly limited. Preferably, the content may be 1 to 10% by mass with reference to the sum of the masses of the positive electrode active material, the conductive auxiliary agent, and the binder. When the contents of the positive electrode active material and the binder are in the above range, it is possible to suppress the tendency to fail to form a robust positive electrode active material layer due to a lack of the binder in the positive electrode active material layer 14 that has been obtained. It is also possible to suppress the tendency to fail to obtain a sufficient volumetric energy density due to an excess of the amount of binder that does not contribute to electric capacity.

(Positive Electrode Conductive Auxiliary Agent)

The conductive auxiliary agent is also not particularly limited, and any known conductive auxiliary agent may be used, provided that the conductive auxiliary agent improves the conductivity of the positive electrode active material layer 14. Examples of the conductive auxiliary agent include carbon-based materials such as graphite and carbon black; metal fine powders of copper, nickel, stainless steel, or iron; mixtures of carbon material and metal fine powder; and conductive oxides such as ITO.

The content of the conductive auxiliary agent in the positive electrode active material layer 14 is also not particularly limited. When the conductive auxiliary agent is added to the positive electrode active material layer 14, the content of the conductive auxiliary agent is preferably in a range of from 0.5% to 5% by mass with respect to the mass of the positive electrode active material.

(Negative Electrode Current Collector)

The negative electrode current collector 22 may be a conductive plate material. Examples of the material of the negative electrode current collector 22 that can be used include metal thin plates (metal foils) of copper, nickel, stainless steel, or an alloy thereof.

(Negative Electrode Active Material Layer)

The negative electrode active material layer 24 mainly includes a negative electrode active material, a negative electrode binder, and a required amount of conductive auxiliary agent.

(Negative Electrode Active Material)

The negative electrode active material according to the present embodiment includes a first negative electrode active material including a carbon material, and a second negative electrode active material including a metal element or a metalloid element as a constituent element, the metal element or the metalloid element being capable of forming an alloy with lithium.

(First Negative Electrode Active Material)

The first negative electrode active material in the present embodiment includes a carbon material, particularly spherical graphite. Spherical graphite, compared with scaly graphite, fragmental graphite and the like, has a high bulk density, is easy to handle in powder form, and has a relatively low specific surface area. Accordingly, use of spherical graphite makes it possible to reduce binder consumption. From these viewpoints, spherical graphite may be preferable.

Examples of the spherical graphite include a spherical graphite obtained by subjecting a spherical mesophase carbon to thermal treatment, and a spherical graphite obtained by rendering a scaly graphite into spherical form through a granulation process. Either of the above may be used as the spherical graphite, provided that either of the above is spherical.

The degree of sphericity of graphite may be expressed by a circularity. The circularity is expressed by "circumference of a particle area-equivalent circle/circumference of a captured particle projection image". The closer the circularity is to 1, the closer the sphere is to a true circle. The circularity may be measured by, for example, observing the graphite particle using SE M and calculating a secondary electron image or a backscattered electron image through image processing. Preferably, the circularity of spherical graphite is 0.80 or more and is more preferably 0.85 or more. When the circularity is in these ranges, excessive binder attachment can be suppressed, the packing property of the negative electrode active material layer in which the spherical graphite is used is improved, and the coating properties of the negative electrode active material layer are also improved.

As the graphite, natural graphite, synthetic graphite and the like may be used. Among others, synthetic graphite may be preferable as it exhibits a high negative electrode capacity and good cycle characteristics.

Most preferably, the carbon material is a single spherical graphite. The carbon material may be a mixture of a spherical graphite and a scaly graphite or a fragmental graphite, in which case the content of the spherical graphite may be preferably 50% to 100%.

When the content of the spherical graphite is in the above range, it becomes possible to suppress excessive binder attachment to the first negative electrode active material, and also to fill gaps in the first negative electrode active material. As a result, it becomes possible to achieve a higher packing property of the negative electrode active material layer.

The graphite has a graphitization degree of 1.0 to 1.5 and more preferably 1.2 to 1.4. The graphitization degree herein refers to a ratio "P101/P100" of a peak intensity P101 of a (101) plane to a peak intensity P100 of a (101) plane in an X-ray diffraction pattern. The ratio indicates the degree of regular arrangement of hexagonal network planes of carbon. The greater the value is, the less a turbostratic structure is formed and the more regularly the hexagonal network planes of carbon are arranged. When the graphitization degree is in the above ranges, the graphite crystal structure is provided with an appropriate level of turbostratic structure. As a result, expansion and shrinkage of a battery cell during charging and discharging can be suppressed.

The graphite has an orientation degree of 40 to 200 and more preferably 50 to 170. The orientation degree herein refers to a ratio "P002/P110" of a peak intensity P002 of a (002) plane to a peak intensity P110 of a (110) plane in an X-ray diffraction pattern. The ratio indicates the orientation of graphite crystals with respect to a negative electrode surface. A small value of the ratio indicates that the hexagonal network planes of carbon are in a state of being not much oriented with respect to the negative electrode surface. On the other hand, a large value of the ratio indicates that the hexagonal network planes of carbon are oriented in a parallel direction with respect to the negative electrode surface. When the orientation degree of the graphite is in the above ranges, the number of insertion sites for Li ion is increased, and the rate performance of the battery cell is improved.

The spherical graphite has an average particle size of 5 mm to 30 mm and more preferably of 9 mm to 25 mm. The average particle size herein refers to a D50 value according to laser diffraction particle size distribution measurement. When the average particle size is in the above ranges, the packing property of the negative electrode is improved, and the coating properties of the negative electrode are also improved.

(Second Negative Electrode Active Material)

In the present embodiment, the second negative electrode active material includes a metal element or a metalloid element as a constituent element, the metal element or the metalloid element being capable of forming an alloy with lithium.

In the above configuration, the cycle characteristics are further improved. This is contemplated to be because the second negative electrode active material, with a metal element or a metalloid element as a constituent element that can form an alloy with lithium, has high affinity for acrylic resin and can therefore efficiently provides the effect of suppressing expansion and shrinkage during charging and discharging.

In the present embodiment, the second negative electrode active material may include Si, Sn, Fe, Ge, Mo, Zn or the like as a constituent element. Among others, the second negative electrode active material may preferably include at least one selected from Si and Sn.

Examples of the material which includes at least one selected from Si and Sn include $SiB_4$, $SiB_6$, $Mg_2Si$, $Ni_2Si$, $TiSi_2$, $MoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $LiSiO$, $SiO_x$ (0<x≦2), $SnO_y$ (0<y≦2), $SnSiO_3$, $LiSnO$, and $Mg_2SnFeO$.

Among the above materials, the second negative electrode active material preferably includes silicon and particularly preferably includes elemental silicon or silicon oxide, from the viewpoint of energy density and low rates of expansion and shrinkage. The second negative electrode active material preferably includes as the silicon oxide, at least one selected from silicon monoxide, silicon dioxide, and a compound expressed by the general formula (1), the compound being a mixture of the silicon monoxide and silicon dioxide with elemental silicon.

$$SiO_x (0<x≦2) \tag{1}$$

The $SiO_x$ (0<x≦2) is preferably amorphous. Being amorphous improves affinity for acrylic resin and enhances the effect of suppressing a volume change due to expansion and shrinkage, whereby superior cycle characteristics can be obtained.

In the present embodiment, the second negative electrode active material may be a mixture of a plurality of compounds including $SiO_x$ (0<x≦2).

The ratio A:B of a weight A of the first negative electrode active material to a weight B of the second negative electrode active material is preferably 99:1 to 65:35. In this configuration, it becomes possible to obtain superior cycle characteristics.

When a plurality of compounds is used for the second negative electrode active material, the weight B of the second negative electrode active material may be the total weight of the plurality of compounds.

(Negative Electrode Binder)

A negative electrode binder is added to maintain an electrode structure by causing constituent members of the negative electrode active material layer 24 to closely attach to each other, or by causing the negative electrode active material layer 24 and the negative electrode current collector 22 to closely attach to each other.

In the present embodiment, the negative electrode binder contains an acrylic resin. The acrylic resin is a synthetic resin of a polymer of an acrylic acid ester or an acrylic acid ester. In this configuration, it becomes possible to obtain a negative electrode for a lithium secondary battery that has excellent cycle characteristics. While the reason for this is not necessarily clear, it is contemplated as follows. That is, adsorption of the acrylic resin with respect to the first negative electrode active material and adsorption of the acrylic resin with respect to the second negative electrode active material are different. Among others, the acrylic resin binds to spherical graphite in a state closer to point-contact. On the other hand, the acrylic resin binds to the second negative electrode active material in a planar-covering manner. Thus, excessive binder attachment to the spherical graphite is suppressed. In addition, it becomes possible to suppress the expansion and shrinkage of the second negative electrode active material associated with charging and discharging.

With regard to the content of the negative electrode binder, preferably, the ratio (A+B)/C of a total of the weight A of the first negative electrode active material and the weight B of the second negative electrode active material to the weight C of the binder is 6 to 20.

When the total of the weight A of the first negative electrode active material and the weight B of the second negative electrode active material with respect to the content of the binder is in the above range, it becomes possible to maintain a sufficient binding property of the negative electrode and to inhibit excess binder from blocking the Li ion conductive paths between the negative electrode active materials in the negative electrode.

Preferably, the ratio B/C of the weight B of the negative electrode active material to the weight C of the binder is 1.4 to 3.

When the content of the binder with respect to the weight of the second negative electrode active material is in the above range, it becomes possible to suppress volume expansion of the second negative electrode active material associated with charging and discharging.

Preferably, the negative electrode binder is one kind of the acrylic resin. The acrylic resin, however, may be mixed with a known negative electrode binder. When the acrylic resin is mixed with a known negative electrode binder, preferably the acrylic resin is included by 70% or more by mass with respect to the total weight of the negative electrode binder.

In this way, it becomes possible to obtain a sufficient effect with respect to each of the first negative electrode active material and the second negative electrode active material.

(Negative Electrode Conductive Auxiliary Agent)

The negative electrode conductive auxiliary agent may have a carbon material added thereto for improving conductivity. Carbon materials have the features of having high electrochemical stability and high bulk at low density, and thus, of providing a sufficient effect for improving conductivity even if added by a small amount. Examples of the carbon material include carbon black such as acetylene black (AB), Ketjen black, furnace black, channel black, and thermal black; carbon fibers such as vapor-grown carbon fiber (VGCF), and carbon nanotube; and graphites. One or more of the above may be used.

The content of the conductive auxiliary agent may also be adjusted, as appropriate, and may be similar to the content in the positive electrode 10 described above. The amount of the conductive auxiliary agent that is added is preferably 0.5 to 5% by mass with respect to the mass of the negative electrode active material.

In the present embodiment, the negative electrode includes a current collector and an active material-containing layer provided on the current collector. The active material-containing layer includes: a first negative electrode active material including a carbon material; a second negative electrode active material including a metal element or a metalloid element as a constituent element, the metal element or the metalloid element being capable of forming an alloy with lithium; and a binder. The first negative electrode active material contains a spherical graphite, and the binder contains an acrylic resin. Using the negative electrode of the above configuration and the members described above makes it possible to improve cycle characteristics.

Generally, the action required from the binder differs between a case where graphite is used as the negative electrode active material and a case where a material that includes a metal element or a metalloid element as a constituent element is used as the negative electrode material, the metal element or the metalloid being capable of forming an alloy with lithium. That is, when graphite is used as the negative electrode active material, the graphite does not cause much volume change associated with charging and discharging and intercalation and deintercalation of Li ions take place from an edge plane. Accordingly, the binder binding the negative electrode is required to have a point contact in a small area. On the other hand, the material that has a metal element or a metalloid element as a constituent element has a large volume change during charging and discharging, the metal element or the metalloid element being capable of forming an alloy with lithium. As a charge/discharge cycle is repeated, a current collection failure may be caused by a severing of electroconductive path. Accordingly, the binder is required to provide binding by planar contact in order to suppress volume change.

An acrylic resin is used as the binder for the graphite as the first negative electrode active material and the material that, as the second negative electrode active material, includes a metal element or a metalloid element as a constituent element, the metal element or the metalloid element being capable of forming an alloy with lithium. In this regard, it is contemplated as follows. The adsorption of acrylic resin with respect to the first negative electrode active material and the adsorption of acrylic resin with respect to the second negative electrode active material differ. The binder binds to a spherical graphite among graphites in a state closer to point-contact. On the other hand, the binder binds to the second negative electrode active material in a planar-covering manner. Accordingly, it becomes possible to suppress excessive binder attachment to the spherical graphite, and to suppress expansion and shrinkage of the second negative electrode active material associated with charging and discharging.

The electrodes 10, 20 including the above-described components may be fabricated by a commonly used method. For example, the electrodes 10, 20 can be manufactured by coating the current collector with a coating material including the active material (positive electrode active material or negative electrode active material), the binder (positive electrode binder or negative electrode binder), the solvent, and the conductive auxiliary agent (positive electrode conductive auxiliary agent or negative electrode conductive auxiliary agent), and then removing solvent from the coating material coated onto the current collector.

Examples of the solvent that can be used include N-methyl-2-pyrrolidone, N, N-dimethylformamide, and water.

The coating method is not particularly limited, and a commonly used method for fabricating an electrode may be used. Examples of the coating method that can be used include a slit die coating method and a doctor blade method.

The solvent in the coating material coated onto the current collectors 12, 22 may be removed by, for example, thermal treatment using an infrared drying furnace or an electrothermal hot-gas drying furnace in a range of from 80° C. to 300° C., in the method described above.

The electrodes with the active material layers 14, 24 formed thereon may be pressed, as needed, by using a roll press device and the like. The roll press may have a linear pressure of, e.g., 10 to 50 kgf/cm. In this way, the electrodes are completed.

Other components of the lithium ion secondary battery 100 will be described.

(Separator)

The separator is not particularly limited provided that the separator is stable with respect to the electrolytic solution and has excellent liquid holding property. Examples of the separator generally include porous sheets of polyolefin such as polyethylene and polypropylene, and nonwoven fabrics.

(Electrolyte)

The electrolyte is contained in the positive electrode active material layer 14, the negative electrode active material layer 24, and the separator 18. The electrolyte is not particularly limited, and, for example, in the present embodiment, an electrolytic solution including a lithium salt (electrolyte aqueous solution or electrolyte solution using organic solvent) may be used. However, an electrolyte aqueous solution has a low electrochemical decomposition voltage. Accordingly, when an electrolyte aqueous solution is used, the withstand voltage during charging may be limited to a low value. Thus, the electrolyte preferably is an electrolytic solution using an organic solvent (non-aqueous electrolyte solution). As the electrolytic solution, an electrolytic solution obtained by dissolving a lithium salt in a non-aqueous solvent (organic solvent) may be preferably used. The lithium salt is not particularly limited, and a lithium salt used as the electrolyte in lithium ion secondary batteries may be used. Examples of the lithium salt that can be used include inorganic acid anionic salts such as $LiPF_6$, $LiBF_4$, LiBETI, LiFSI, and LiBOB, and organic acid anionic salts such as $LiCF_3SO_3$ and $(CF_3SO_2)_2NLi$.

Examples of the organic solvent include: aprotonic high dielectric-constant solvents such as ethylene carbonate, propylene carbonate, and fluoroethylene carbonate; acetates such as di methyl carbonate, ethyl methyl carbonate, and di ethyl carbonate; and aprotonic low-viscosity solvents such as propionate esters. Preferably, the aprotonic high dielectric-constant solvent and the aprotonic low-viscosity solvent may be mixed at an appropriate mixture ratio. Further, it is also possible to use an ionic liquid using imidazolium, ammonium, or pyridinium cations. The counter anion is not particularly limited, and examples thereof include $BF_4$, $PF_6$, and $(CF_3SO_2)_2N^-$. The ionic liquid may be used in a mixture with the organic solvent.

The organic solvent according to the present embodiment preferably includes a mixture of a cyclic carbonate and a chain carbonate. From the viewpoint of balance between discharge capacity cycle characteristics, the organic solvent preferably contains at least one selected from ethylene carbonate, di ethyl carbonate, and fluoroethyl ene carbonate.

The content of fluoroethyl ene carbonate with respect to the entire organic solvent is preferably 5 to 10% by weight. In this way, it becomes possible to obtain higher cycle characteristics.

The concentration of lithium salt in the electrolytic solution is preferably 0.5 to 2.0M from the viewpoint of electric conductivity. Preferably, the conductivity of the electrolyte at the temperature of 25° C. is preferably 0.01 S/m or more. The conductivity is adjusted depending on the type of electrolyte salt or on the concentration thereof.

When the electrolyte is a solid electrolyte or a gel electrolyte, the electrolyte may contain poly(vinylidene fluoride) and the like as a polymer material.

Further, various additives may be added to the electrolytic solution of the present embodiment, as needed. Examples of the additive include: vinylene carbonate and methylvinylene carbonate for the purpose of improving the cycle life; biphenyl and alkylbiphenyl for the purpose of preventing overcharge; and various carbonate compounds, various carboxylic acid anhydrides, and various nitrogen- or sulfur-containing compounds for the purpose of deoxidation and dehydration.

(Case)

The case 50 has sealed while the stacked body 30 and the electrolytic solution are provide therein. The case 50 is not particularly limited, provided that the case 50 is configured to suppress leakage of the electrolytic solution to the outside and to suppress entry of water and the like into the lithium ion secondary battery 100 from the outside. For example, as illustrated in FIG. 1, a metal laminate film may be used as the case 50. The metal laminate film includes a metal foil 52 coated on both sides thereof with polymer films 54. As the metal foil 52, an aluminum foil may be used. As the polymer films 54, films of polypropylene and the like may be used. For example, the material of the outer polymer film 54 preferably is a polymer having a high melting point, such as polyethylene terephthalate (PE T) or polyamide. The material of the inner polymer film 54 preferably is polyethylene (PE), polypropylene (PP) or the like.

(Leads)

The leads 60, 62 are formed from a conductive material, such as aluminum.

The leads 60, 62 are respectively welded to the positive electrode current collector 12 and the negative electrode current collector 22 by a known method. The separator 18 is sandwiched between the positive electrode active material layer 14 of the positive electrode 10 and the negative electrode active material layer 24 of the negative electrode 20. In this state, the positive electrode 10, the negative electrode 20, and the separator 18 are inserted into the case 50 together with the electrolytic solution, and then an entry opening of the case 50 is sealed.

While a preferred embodiment of the present disclosure has been described, the technology of the present disclosure is not limited to the foregoing embodiment. For example, the lithium ion secondary battery is not limited to the one with the shape illustrated in FIG. 1. The lithium ion secondary battery may be of a coin type in which electrodes punched out in coin shape and a separator are stacked, or of a cylinder type in which electrode sheets and a separator are wound in spiral shape.

EXAMPLES

Example 1

(Fabrication of Negative Electrode for Lithium Ion Secondary Battery)

First, a spherical synthetic graphite (average particle size 11 mm) was prepared as the first negative electrode active material, and $SiO_x$ was prepared as the second negative electrode active material. The first negative electrode active material and the second negative electrode active material were weighed such that their weight ratio was 99:1. Then, dry blending was performed for 30 minutes in a planetary mixer. In this way, a negative electrode active material for a lithium ion secondary battery according to Example 1 was fabricated.

A paste of negative electrode slurry was fabricated by mixing and dispersing 93% by weight of the negative electrode active material for a lithium ion secondary battery, 2% by weight of acetylene black as a conductive auxiliary agent, 5% by weight of an acrylic acid ester polymer as a binder, and water. Then, using a comma roll coater, both surfaces of a copper foil with a thickness of 10 mm was uniformly coated with the negative electrode slurry to a predetermined thickness as negative electrode active material layers. The negative electrode active material layers were then dried in a drying furnace at 90° C. under an air atmosphere. The thicknesses of the coated films of the negative electrode active material layers coated onto both surfaces of the copper foil were adjusted to be substantially the same. Using a roll press machine, the negative electrode active material layers of the negative electrode formed from the negative electrode active material were press-attached to both surfaces of a negative electrode current collector. In this way, a negative electrode sheet having a predetermined density was obtained.

The negative electrode sheet was punched out into an electrode size of 21 B 31 mm with a die. In this way, the negative electrode for a lithium ion secondary battery electrode was fabricated.

(Fabrication of Positive Electrode for Lithium Ion Secondary Battery)

A paste of positive electrode slurry was fabricated by mixing and dispersing 96% by weight of lithium cobaltate ($LiCoO_2$) as a positive electrode active material, 2% by weight of Ketjen black as a conductive auxiliary agent, 2% by weight of PVDF as a binder, and N-methyl-2-pyrrolidone as a solvent. Using a comma roll coater, both surfaces of an aluminum foil with a thickness of 20 mm was uniformly coated with the positive electrode slurry to a predetermined thickness as a positive electrode active material layer. Then, the N-methyl-2-pyrrolidone solvent was dried in a drying furnace at 110° C. under an air atmosphere. The thicknesses of the coated films of the positive electrode active material layers coated on both surfaces of an aluminum foil were adjusted to be substantially the same. Using a roll press machine, the positive electrode active material layers of the positive electrode formed from the positive electrode active material were press-attached to both surfaces of a positive electrode current collector. In this way, a positive electrode sheet having a predetermined density was obtained.

The positive electrode sheet was punched out to an electrode size of 20 B 30 mm with a die. In this way, a positive electrode for a lithium ion secondary battery electrode was fabricated.

(Fabrication of Lithium Ion Secondary Battery)

An electrode body was fabricated by stacking the negative electrode and the positive electrode fabricated as described above, via a polypropylene separator having a thickness of 16 mm and a size of 22 B 33 mm. Three sheets of the negative electrode and two sheets of the positive electrode were stacked via four sheets of the separator in such a way that the negative electrode and the positive electrode were alternately stacked. Further, a negative electrode lead made of nickel was attached to a copper foil protruding edge part of the negative electrode of the electrode body where the negative electrode active material layer was not provided. On the other hand, a positive electrode lead made of aluminum was attached to an aluminum foil protruding edge part of the positive electrode of the electrode body where the positive electrode active material layer was not provided, using ultrasonic welding machine. The electrode body was inserted into an outer casing member of an aluminum laminate film, and the periphery of the outer casing member was heat-sealed except for one location, whereby an opening in the outer casing member was formed. An electrolytic solution was injected into the outer casing member. The electrolytic solution included a solvent of EC/DEC at a blending ratio of 3:7 to which 1 M (mol/L) of $LiPF_6$ was added as a lithium salt. Thereafter, the one un-sealed location in the periphery of the outer casing member was heat-sealed while the interior of the outer casing member was depressurized by a vacuum sealer. In this way, a lithium ion secondary battery according to Example 1 was fabricated.

Example 2

A negative electrode for a lithium ion secondary battery and a lithium ion secondary battery according to Example 2 were fabricated in the same way as in Example 1, with the exception that a spherical synthetic graphite was prepared as the first negative electrode active material, $SiO_x$ was prepared as the second negative electrode active material, and the first negative electrode active material and the second negative electrode active material were weighed such that they had a weight ratio of 95:5.

Example 3

A negative electrode for a lithium ion secondary battery and a lithium ion secondary battery according to Example 3 were fabricated in the same way as in Example 1, with the exception that a spherical synthetic graphite was prepared as the first negative electrode active material, $SiO_x$ was prepared as the second negative electrode active material, and the first negative electrode active material and the second negative electrode active material were weighed such that they had a weight ratio of 90:10.

Example 4

A negative electrode for a lithium ion secondary battery and a lithium ion secondary battery according to Example 4 were fabricated in the same way as in Example 1, with the exception that a spherical synthetic graphite was prepared as the first negative electrode active material, SiOx was prepared as the second negative electrode active material, and the first negative electrode active material and the second negative electrode active material were weighed such that they had a weight ratio of 80:20.

Example 5

A negative electrode for a lithium ion secondary battery and a lithium ion secondary battery according to Example 5 were fabricated in the same way as in Example 1, with the exception that a spherical synthetic graphite was prepared as the first negative electrode active material, SiOx was prepared as the second negative electrode active material, and the first negative electrode active material and the second negative electrode active material were weighed such that they had a weight ratio of 70:30.

Example 6

A negative electrode for a lithium ion secondary battery and a lithium ion secondary battery according to Example 6 were fabricated in the same way as in Example 1, with the exception that a spherical synthetic graphite was prepared as the first negative electrode active material, SiOx was prepared as the second negative electrode active material, and the first negative electrode active material and the second negative electrode active material were weighed such that they had a weight ratio of 65:35.

Example 7

A negative electrode for a lithium ion secondary battery and a lithium ion secondary battery according to Example 7 were fabricated in the same way as in Example 1, with the exception that a spherical synthetic graphite was prepared as the first negative electrode active material, SiOx was prepared as the second negative electrode active material, and the first negative electrode active material and the second negative electrode active material were weighed such that they had a weight ratio of 60:40.

Example 8

A negative electrode for a lithium ion secondary battery and a lithium ion secondary battery according to Example 8 were fabricated in the same way as in Example 1, with the exception that a spherical synthetic graphite was prepared as the first negative electrode active material, Sn was prepared as the second negative electrode active material, and the first negative electrode active material and the second negative electrode active material were weighed such that they had a weight ratio of 80:20.

Example 9

A negative electrode for a lithium ion secondary battery and a lithium ion secondary battery according to Example 9 were fabricated in the same way as in Example 1, with the exception that a spherical synthetic graphite was prepared as the first negative electrode active material, $MoO_3$ was prepared as the second negative electrode active material, and the first negative electrode active material and the second negative electrode active material were weighed such that they had a weight ratio of 80:20.

Example 10

A negative electrode for a lithium ion secondary battery and a lithium ion secondary battery according to Example 10 were fabricated in the same way as in Example 4, with the exception that the paste of negative electrode slurry was fabricated by mixing and dispersing 94% by weight of the negative electrode active material for a lithium ion secondary battery, 2% by weight of acetylene black as the conductive auxiliary agent, 4% by weight of acrylic acid ester polymer as the binder, and water.

Example 11

A negative electrode for a lithium ion secondary battery and a lithium ion secondary battery according to Example 11 were fabricated in the same way as in Example 4, with the exception that the paste of negative electrode slurry was fabricated by mixing and dispersing 91% by weight of the negative electrode active material for a lithium ion secondary battery, 2% by weight of acetylene black as the conductive auxiliary agent, 7% by weight of acrylic acid ester polymer as the binder, and water.

Example 12

A negative electrode for a lithium ion secondary battery and a lithium ion secondary battery according to Example 12 were fabricated in the same way as in Example 4, with the exception that the paste of negative electrode slurry was fabricated by mixing and dispersing 88% by weight of the negative electrode active material for a lithium ion secondary battery, 2% by weight of acetylene black as the conductive auxiliary agent, 10% by weight of acrylic acid ester polymer as the binder, and water.

Example 13

A negative electrode for a lithium ion secondary battery and a lithium ion secondary battery according to Example 13 were fabricated in the same way as in Example 4, with the exception that the paste of negative electrode slurry was fabricated by mixing and dispersing 84% by weight of the negative electrode active material for a lithium ion secondary battery, 2% by weight of acetylene black as the conductive auxiliary agent, 14% by weight of acrylic acid ester polymer as the binder acrylic resin, and water.

Example 14

A negative electrode for a lithium ion secondary battery and a lithium ion secondary battery according to Example 14 were fabricated in the same way as in Example 4, with the exception that the paste of negative electrode slurry was fabricated by mixing and dispersing 82% by weight of the negative electrode active material for a lithium ion secondary battery, 2% by weight of acetylene black as the conductive auxiliary agent, 16% by weight of acrylic acid ester polymer as the binder acrylic resin, and water.

Example 15

A negative electrode for a lithium ion secondary battery and a lithium ion secondary battery according to Example 15 were fabricated in the same way as in Example 4, with the exception that the paste of negative electrode slurry was fabricated by mixing and dispersing 81% by weight of the negative electrode active material for a lithium ion secondary battery, 2% by weight of acetylene black as the conductive auxiliary agent, 17% by weight of acrylic acid ester polymer as the binder acrylic resin, and water.

Example 16

A negative electrode for a lithium ion secondary battery and a lithium ion secondary battery according to Example 16 were fabricated in the same way as in Example 4, with the exception that the paste of negative electrode slurry was fabricated by mixing and dispersing 5% by weight of a mixture of acrylic acid ester polymer and an SBR/CMC resin at 70:30 as the binder acrylic resin, and water.

Example 17

A negative electrode for a lithium ion secondary battery and a lithium ion secondary battery according to Example 17 were fabricated in the same way as in Example 4, with the exception that the paste of negative electrode slurry was fabricated by mixing and dispersing 5% by weight of a mixture of acrylic acid ester polymer and an SBR/CMC resin at 65:35 as the binder acrylic resin, and water.

Example 18

A negative electrode for a lithium ion secondary battery and a lithium ion secondary battery according to Example 18 were fabricated in the same way as in Example 11, with the exception that a nickel-cobalt-manganese ternary positive electrode active material ($LiNi_{0.80}Co_{0.10}Mn_{0.10}O_2$, hereafter 'NCM_) was used as the positive electrode active material.

Example 19

A negative electrode for a lithium ion secondary battery and a lithium ion secondary battery according to Example 19 were fabricated in the same way as in Example 11, with the exception that as the electrolytic solution, there was used an electrolytic solution including a solvent of EC/DEC/FEC at a blending ratio of 25:65:10 to which 1 M (mol/L) of $LiPF_6$ was added as a lithium salt.

Example 20

A negative electrode for a lithium ion secondary battery and a lithium ion secondary battery according to Example 20 were fabricated in the same way as in Example 18, with the exception that, as the electrolytic solution, there was used an electrolytic solution comprising a solvent of EC/DEC/FEC at a blending ratio of 25:65:10 to which 1 M (mol/L) of $LiPF_6$ was added as a lithium salt.

Example 21

A negative electrode for a lithium ion secondary battery and a lithium ion secondary battery according to Example 21 were fabricated in the same way as in Example 18, with the exception that, as the electrolytic solution, there was used an electrolytic solution comprising a solvent of EC/DEC/FEC at a blending ratio of 23:72:5 to which 1 M (mol/L) of $LiPF_6$ was added as a lithium salt.

Example 22

A negative electrode for a lithium ion secondary battery and a lithium ion secondary battery according to Example 22 were fabricated in the same way as in Example 11, with the exception that, as the positive electrode active material, a nickel-cobalt-aluminum ternary positive electrode active material ($LiNi_{0.85}Co_{0.10}Al_{0.05}O_2$, hereafter 'NCA_) was used.

Comparative Example 1

A negative electrode for a lithium ion secondary battery and a lithium ion secondary battery according to Comparative Example 1 were fabricated in the same way as in Example 4, with the exception that a scaly synthetic graphite was used as the first negative electrode active material.

Comparative Example 2

A negative electrode for a lithium ion secondary battery and a lithium ion secondary battery according to Comparative Example 2 were fabricated in the same way as in Example 4, with the exception that an SBR/CMC resin was used as the binder.

Comparative Example 3

A negative electrode for a lithium ion secondary battery and a lithium ion secondary battery according to Comparative Example 3 were fabricated in the same way as in Example 4, with the exception that a PVDF resin was used as the binder.

Comparative Example 4

A negative electrode for a lithium ion secondary battery and a lithium ion secondary battery according to Comparative Example 4 were fabricated in the same way as in Example 1, with the exception that only a spherical synthetic graphite was used as the negative electrode active material, and that the paste of negative electrode slurry was fabricated by mixing and dispersing 2% by weight of acetylene black as the conductive auxiliary agent, 5% by weight of acrylic acid ester polymer as the binder acrylic resin, and water.

Comparative Example 5

A negative electrode for a lithium ion secondary battery and a lithium ion secondary battery according to Comparative Example 5 were fabricated in the same way as in Example 1, with the exception that only $SiO_x$ was used as the negative electrode active material, and that the paste of negative electrode slurry was fabricated by mixing and dispersing 2% by weight of acetylene black as the conductive auxiliary agent, 20% by weight of acrylic acid ester polymer as the binder acrylic resin, and water.

(Characteristics Evaluation Method)

With respect to the lithium ion secondary batteries for evaluation fabricated according to Examples and Comparative Examples, cycle characteristics measurement was performed using a secondary battery charging and discharging testing device (manufactured by HOKUTO DENKO CORPORATION). The cycle characteristics were measured under the following conditions. At room temperature, a charge/discharge cycle of performing constant-current constant-voltage charging at 0.5 C to 4.2 V and performing constant-current discharging at 1 C to 2.5 V was repeated 300 times. The discharge capacity from the initial cycle to the 300th cycle was measured. In each of the lithium ion secondary batteries according to Examples and Comparative Examples, the discharge capacity of the initial cycle and the discharge capacity after 300 cycles with respect to the discharge capacity of the initial cycle were measured. In addition, each lithium ion secondary battery was evaluated in terms of initial discharge capacity, discharge capacity as capacity retention, and cycle characteristics. In the measurement, the initial discharge capacity is the capacity per unit weight of the positive electrode active material. Capacity retention was indicated by percentage.

Table 1 indicates the positive electrode active material, the first negative electrode active material, the second negative electrode active material, binder type, and the electrolytic solution composition of Examples 1 to 22 and Comparative Examples 1 to 5. Table 2 indicates, with respect to Examples 1 to 22 and Comparative Examples 1 to 5: the mixture ratio of the first active material and the second active material; binder amount; the ratio (A+B)/C of a total of the weight A of the first negative electrode active material and the weight B of the second negative electrode active material to the weight C of the binder; the ratio B/C of the weight B of the second negative electrode active material to the weight C of the binder; the capacity retention after 300 cycles (hereafter 'capacity retention_(%)); and the initial discharge capacity (mAh/g).

TABLE 1

|  | Positive electrode active material | Electrolytic solution composition | First negative electrode active material | Second negative electrode active material | Binder |
|---|---|---|---|---|---|
| Example 1 | LCO | EC/DEC = 30/70 1M $LiPF_6$ | Spherical graphite | $SiO_x$ | Acrylic acid ester polymer |
| Example 2 | LCO | EC/DEC = 30/70 1M $LiPF_6$ | Spherical graphite | $SiO_x$ | Acrylic acid ester polymer |
| Example 3 | LCO | EC/DEC = 30/70 1M $LiPF_6$ | Spherical graphite | $SiO_x$ | Acrylic acid ester polymer |
| Example 4 | LCO | EC/DEC = 30/70 1M $LiPF_6$ | Spherical graphite | $SiO_x$ | Acrylic acid ester polymer |
| Example 5 | LCO | EC/DEC = 30/70 1M $LiPF_6$ | Spherical graphite | $SiO_x$ | Acrylic acid ester polymer |
| Example 6 | LCO | EC/DEC = 30/70 1M $LiPF_6$ | Spherical graphite | $SiO_x$ | Acrylic acid ester polymer |
| Example 7 | LCO | EC/DEC = 30/70 1M $LiPF_6$ | Spherical graphite | $SiO_x$ | Acrylic acid ester polymer |

TABLE 1-continued

|  | Positive electrode active material | Electrolytic solution composition | First negative electrode active material | Second negative electrode active material | Binder |
|---|---|---|---|---|---|
| Example 8 | LCO | EC/DEC = 30/70 1M LiPF$_6$ | Spherical graphite | Sn | Acrylic acid ester polymer |
| Example 9 | LCO | EC/DEC = 30/70 1M LiPF$_6$ | Spherical graphite | MoO$_3$ | Acrylic acid ester polymer |
| Example 10 | LCO | EC/DEC = 30/70 1M LiPF$_6$ | Spherical graphite | SiO$_x$ | Acrylic acid ester polymer |
| Example 11 | LCO | EC/DEC = 30/70 1M LiPF$_6$ | Spherical graphite | SiO$_x$ | Acrylic acid ester polymer |
| Example 12 | LCO | EC/DEC = 30/70 1M LiPF$_6$ | Spherical graphite | SiO$_x$ | Acrylic acid ester polymer |
| Example 13 | LCO | EC/DEC = 30/70 1M LiPF$_6$ | Spherical graphite | SiO$_x$ | Acrylic acid ester polymer |
| Example 14 | LCO | EC/DEC = 30/70 1M LiPF$_6$ | Spherical graphite | SiO$_x$ | Acrylic acid ester polymer |
| Example 15 | LCO | EC/DEC = 30/70 1M LiPF$_6$ | Spherical graphite | SiO$_x$ | Acrylic acid ester polymer |
| Example 16 | LCO | EC/DEC = 30/70 1M LiPF$_6$ | Spherical graphite | SiO$_x$ | Acrylic acid ester polymer: SBR/CMC = 70/30 |
| Example 17 | LCO | EC/DEC = 30/70 1M LiPF$_6$ | Spherical graphite | SiO$_x$ | Acrylic acid ester polymer: SBR/CMC = 65/35 |
| Example 18 | NCM | EC/DEC = 30/70 1M LiPF$_6$ | Spherical graphite | SiO$_x$ | Acrylic acid ester polymer |
| Example 19 | LCO | EC/DEC/FEC = 25/65/10 1M LiPF$_6$ | Spherical graphite | SiO$_x$ | Acrylic acid ester polymer |
| Example 20 | NCM | EC/DEC/FEC = 25/65/10 1M LiPF$_6$ | Spherical graphite | SiO$_x$ | Acrylic acid ester polymer |
| Example 21 | NCM | EC/DEC/FEC = 23/72/5 1M LiPF$_6$ | Spherical graphite | SiO$_x$ | Acrylic acid ester polymer |
| Example 22 | NCA | EC/DEC = 30/70 1M LiPF$_6$ | Spherical graphite | SiO$_x$ | Acrylic acid ester polymer |
| Comparative Example 1 | LCO | EC/DEC = 30/70 1M LiPF$_6$ | Scaly graphite | SiO$_x$ | Acrylic acid ester polymer |
| Comparative Example 2 | LCO | EC/DEC = 30/70 1M LiPF$_6$ | Spherical graphite | SiO$_x$ | SBR/CMC |
| Comparative Example 3 | LCO | EC/DEC = 30/70 1M LiPF$_6$ | Spherical graphite | SiO$_x$ | PVDF |
| Comparative Example 4 | LCO | EC/DEC = 30/70 1M LiPF$_6$ | Spherical graphite | — | Acrylic acid ester polymer |
| Comparative Example 5 | LCO | EC/DEC = 30/70 1M LiPF$_6$ | — | SiO$_x$ | Acrylic acid ester polymer |

TABLE 2

|  | First active material:second active material [weight ratio] | Binder amount | (A + B)/C | B/C | Capacity retention [%] | Initial discharge capacity [mAh/g] |
|---|---|---|---|---|---|---|
| Example 1 | 99:1 | 5 | 20.0 | 0.2 | 88 | 140.8 |
| Example 2 | 95:5 | 5 | 20.0 | 1.0 | 88 | 139.2 |
| Example 3 | 90:10 | 5 | 20.0 | 2.0 | 87 | 137.6 |
| Example 4 | 80:20 | 5 | 20.0 | 4.0 | 87 | 136.1 |
| Example 5 | 70:30 | 5 | 20.0 | 6.0 | 84 | 134.4 |
| Example 6 | 65:35 | 5 | 20.0 | 7.0 | 83 | 132.8 |
| Example 7 | 60:40 | 5 | 20.0 | 8.0 | 78 | 131.2 |
| Example 8 | 80:20 | 5 | 20.0 | 4.0 | 83 | 135.9 |
| Example 9 | 80:20 | 5 | 20.0 | 4.0 | 78 | 133.5 |
| Example 10 | 80:20 | 4 | 25.0 | 5.0 | 80 | 136.2 |
| Example 11 | 80:20 | 7 | 14.3 | 2.9 | 90 | 136.1 |
| Example 12 | 80:20 | 10 | 10.0 | 2.0 | 92 | 137.2 |
| Example 13 | 80:20 | 14 | 7.1 | 1.4 | 91 | 136.3 |
| Example 14 | 80:20 | 16 | 6.3 | 1.3 | 85 | 136.2 |
| Example 15 | 80:20 | 17 | 5.9 | 1.2 | 83 | 136.2 |
| Example 16 | 80:20 | 5 | 20.0 | 4.0 | 85 | 137.2 |
| Example 17 | 80:20 | 5 | 20.0 | 4.0 | 81 | 137.2 |
| Example 18 | 80:20 | 7 | 14.3 | 2.9 | 93 | 170.1 |
| Example 19 | 80:20 | 7 | 14.3 | 2.9 | 93 | 136.4 |
| Example 20 | 80:20 | 7 | 14.3 | 2.9 | 95 | 169.7 |
| Example 21 | 80:20 | 7 | 14.3 | 2.9 | 94 | 170 |
| Example 22 | 80:20 | 7 | 14.3 | 2.9 | 92 | 178.5 |
| Comparative Example 1 | 80:20 | 5 | 20.0 | 4.0 | 65 | 135.4 |
| Comparative Example 2 | 80:20 | 5 | 20.0 | 4.0 | 60 | 136.1 |

TABLE 2-continued

| | First active material:second active material [weight ratio] | Binder amount | (A + B)/C | B/C | Capacity retention [%] | Initial discharge capacity [mAh/g] |
|---|---|---|---|---|---|---|
| Comparative Example 3 | 80:20 | 5 | 20.0 | 4.0 | 62 | 135.2 |
| Comparative Example 4 | 100:0 | 5 | 20.0 | | 73 | 141.1 |
| Comparative Example 5 | 0:100 | 20 | 5.0 | 5.0 | 65 | 121.4 |

As will be seen from Table 1 and Table 2, it has become clear that the cycle characteristics are improved when the first negative electrode active material including a carbon material, the second negative electrode active material including a metal element or a metalloid element that can form an alloy with lithium, and a binder are included, wherein the first negative electrode active material contains a spherical graphite and the binder contains an acrylic resin.

It has become clear from Examples 1 to 7 that the cycle characteristics are further improved when the ratio A:B of the weight A of the first negative electrode active material to the weight B of the second negative electrode active material is 99:1 to 65:35. This is contemplated to be because the capacity-cycle balance becomes preferable and the cycle characteristics are improved when the first negative electrode active material and the second negative electrode active material are mixed in the above range.

It has become clear from Examples 10 to 15 and Example 4 that the cycle characteristics are further improved when the ratio (A+B)/C of a total of the weight A of the first negative electrode active material and the weight B of the second negative electrode active material to the weight C of the binder is 6 to 20.

It has also become clear that the cycle characteristics are further improved when the ratio B/C of the weight B of the second negative electrode active material to the weight C of the binder is 1.4 to 3. This is contemplated to be because the cycle characteristics are improved because of the suppression of the expansion and shrinkage of the second negative electrode active material when the ratio of the weight B of the second negative electrode active material to the weight C of the binder is in the above range.

Comparing Example 4 with Comparative Example 1, it has become clear that the cycle characteristics are improved when the first negative electrode active material including a carbon material is a spherical graphite. This is contemplated to be because of the following. In Comparative Example 1, the scaly graphite excessively consumed the acrylic resin, resulting in a decrease in the amount of binder required for binding the second negative electrode active material, and a failure to sufficiently suppress the expansion and shrinkage of the second negative electrode active material. On the other hand, in Example 4, the adhesion between the spherical graphite and the acrylic resin was in a state close to point-contact, whereby the amount of binder binding the first negative electrode active material and the second negative electrode active material became preferable, resulting in an improvement in the cycle characteristics.

It has become clear from Example 4, Comparative Example 2, and Comparative Example 3 that the cycle characteristics are improved when the binder contains an acrylic resin. This is thought to be because the use of acrylic resin results in an appropriate adhesion/binding state between the first negative electrode active material and the second negative electrode active material, thereby improving the cycle characteristics.

It has become clear from Example 4, Example 8, and Example 9 that the cycle characteristics are improved when the second negative electrode active material includes at least one selected from Si and Sn as a constituent element. This is thought to be because of the following. That is, the affinity between the second negative electrode active material and the acrylic resin becomes appropriate, the second negative electrode active material including at least one selected from Si and Sn as a constituent element. As a result, the effect of suppressing the expansion and shrinkage during charging and discharging is enhanced, whereby the cycle characteristics are improved.

It has become clear from Comparative Example 4 and Comparative Example 5 that sufficient cycle characteristics cannot be obtained with the single first negative electrode active material electrode or the single second negative electrode active material electrode, and that the cycle characteristics are improved by mixing the negative electrode active material including: the first negative electrode active material including a spherical graphite; and the second negative electrode active material including a metal element or a metalloid element as a constituent element, the metal element or the metalloid element being capable of forming an alloy with lithium; and an acrylic resin.

It has become clear from Example 16, Example 17, and Example 4 that, when an acrylic resin is mixed with a known negative electrode binder, a sufficient effect can be obtained by using 70% by mass or more of acrylic resin with respect to the total weight of negative electrode binder.

It has become clear from Example 11, Example 18, and Example 22 that the initial discharge capacity and the cycle characteristics are improved and both high capacity and good cycle characteristics can be achieved by using a nickel-cobalt-manganese (NCM) ternary positive electrode active material as the positive electrode active material, or by using a nickel-cobalt-aluminum (NCA) ternary positive electrode active material as the positive electrode active material.

It has become clear from Example 11 and Example 19 that the cycle characteristics are further improved by using, as the solvent for the electrolytic solution, a solvent of EC/DEC at a blending ratio of 30/70, or a solvent of EC/DEC/FEC at a blending ratio of 25/65/10.

It has become clear from Example 20 and Example 21 that the initial discharge capacity and the cycle characteristics are improved and both high capacity and good cycle characteristics can be achieved by using NC M and, as the solvent for the electrolytic solution, a solvent in which 5 to 10% by weight of FEC is blended.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A negative electrode for a lithium ion secondary battery, the negative electrode comprising:
   a current collector; and
   an active material-containing layer disposed on the current collector, wherein
   the active material-containing layer includes:
      a first negative electrode active material including a carbon material;
      a second negative electrode active material including a metal element or a metalloid element as a constituent element, the metal element or the metalloid element being capable of forming an alloy with lithium; and
      a binder, wherein
   the first negative electrode active material contains a spherical graphite
   the second negative electrode active material contains amorphous $SiO_x$, where $0<x<2$,
   the binder contains an acrylic resin,
   a ratio (A+B)/C of a total of a weight A of the spherical graphite and a weight B of the amorphous $SiO_x$ to a weight C of the acrylic resin is 6 to 20, and
   a ratio B/C of the weight B of the amorphous $SiO_x$ to the weight C of the acrylic resin is 1.4 to 3.

2. The negative electrode for a lithium ion secondary battery according to claim 1, wherein
   the second negative electrode active material containing the amorphous $SiO_x$, is a mixture of silicon monoxide and silicon dioxide with elemental silicon.

3. The negative electrode for a lithium ion secondary battery according to claim 1, wherein
   a ratio A:B of a weight A of the first negative electrode active material to a weight B of the second negative electrode active material is 99:1 to 65:35.

4. A lithium ion secondary battery comprising:
   the negative electrode for the lithium ion secondary battery according to claim 1;
   a positive electrode; and
   an electrolyte.

5. The negative electrode for a lithium ion secondary battery according to claim 1, wherein
   a ratio A:B of a weight A of the spherical graphite to a weight B of the amorphous $SiO_x$ is 99:1 to 65:35.

6. The negative electrode for a lithium ion secondary battery according to claim 1, wherein
   the ratio (A+B)/C is 7.1-14.3.

7. The negative electrode for a lithium ion secondary battery according to claim 1, wherein
   the ratio (A+B)/C is 7.1-14.3,
   the ratio B/C is 1.4-2.9, and
   a ratio A:B of a weight A of the first negative electrode active material to a weight B of the second negative electrode active material is a weight ratio of the first active material and the second active material is 80:20.

* * * * *